United States Patent
Baumbach

(10) Patent No.: US 7,029,024 B2
(45) Date of Patent: Apr. 18, 2006

(54) AIR BAG HOUSING

(75) Inventor: Eric Baumbach, Sterling Heights, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 210 days.

(21) Appl. No.: 10/668,339

(22) Filed: Sep. 24, 2003

(65) Prior Publication Data

US 2005/0062261 A1   Mar. 24, 2005

(51) Int. Cl.
*B60R 21/16* (2006.01)

(52) U.S. Cl. .................. 280/728.2; 280/743.1

(58) Field of Classification Search ............ 280/728.2, 280/743.1, 731, 732
See application file for complete search history.

(56) References Cited

U.S. PATENT DOCUMENTS 5,542,692 A * 8/1996 Shaklik et al. ........... 280/728.2
6,092,833 A * 7/2000 Nariyasu ................. 280/728.2
6,161,865 A * 12/2000 Rose et al. .............. 280/728.3
6,273,455 B1 * 8/2001 Bohn ...................... 280/728.2
6,846,005 B1 * 1/2005 Ford et al. ............... 280/728.2

FOREIGN PATENT DOCUMENTS

GB    2 323 572 A    9/1998

OTHER PUBLICATIONS

Opel Plastic Housing Version 1 Core Airbag Engineering Jul. 17, 2003-Proprietary-BREED.
Opel Plastic Housing Version 2 Core Airbag Engineering Jul. 17, 2003-Proprietary-BREED.

* cited by examiner

*Primary Examiner*—David R. Dunn

(57) ABSTRACT

An air bag module has an air bag, an air bag inflator and an air bag housing. The air bag has flaps that extend through slots in the air bag housing. The flaps are folded onto hooks on the exterior of the air bag housing. The slots extend around a mouth of the air bag housing.

11 Claims, 4 Drawing Sheets

AIR BAG HOUSING

FIELD OF THE INVENTION

The present invention relates to an air bag module for a vehicle.

BACKGROUND OF THE INVENTION

An air bag module typically comprises an air bag and an air bag inflator. Both the air bag and the air bag inflator are stored within a housing until deployment of the air bag. When the air bag deploys, the air bag inflator fills the air bag with inflation gas, causing the air bag to expand through a mouth of the housing. To ensure proper deployment of the air bag, the air bag is typically secured to the air bag housing by a retaining frame, which is inserted into the housing and snapped into place. However, this retaining frame adds significant cost to the air bag module.

Manufacturers have sought to eliminate the retaining frame. One proposed design attaches the air bag to hooks on the outside of the air bag housing. However, such a design allows excessive amounts of inflation gas to leak between the air bag and the exterior surface of the air bag housing. As a consequence, the air bag might under-inflate.

A need therefore exists for an improved air bag module that eliminates the retaining frame without the drawback of existing designs.

SUMMARY OF THE INVENTION

The present invention comprises an air bag module having an air bag, an air bag inflator and an air bag housing. In contrast to existing designs, the air bag module of the present invention has an air bag with flaps and an air bag housing with slots to receive the flaps. The flaps extend through the slots of the air bag housing and are hooked to the exterior surface of the air bag housing. In this way, the air bag is directly attached to the air bag housing, thereby eliminating the need for a retaining ring. Moreover, the inventive design provides a better seal between the air bag and the housing than the existing design.

The flaps may have a first connection feature, such as a hole, and the air bag housing may have a second connection feature, such as a hook to fit in the hole. The hooks may be located on the exterior surface of the air bag housing. The slots of the air bag housing may be located between these hooks and a bottom of the air bag housing. This particular design allows the air bag flaps to pass through slots located beneath the hooks and then to be folded up onto the hooks, providing a secure connection between air bag and air bag housing.

The inventive air bag module may comprise an air bag with an air bag opening. Four or more flaps extend around the opening. An air bag inflator is in communication with the air bag opening. The air bag module has a housing with slots extending around an opening of the air bag housing. The flaps extend through the slots and are attached to hooks on the exterior surface of the housing. The hooks may be located above the slots so that the flaps may be passed through the slots and folded up over the hooks.

BRIEF DESCRIPTION OF THE DRAWINGS

The various features and advantages of this invention will become apparent to those skilled in the art from the following detailed description of the currently preferred embodiment.

DETAILED DESCRIPTION OF THE INVENTION

Figure 1:
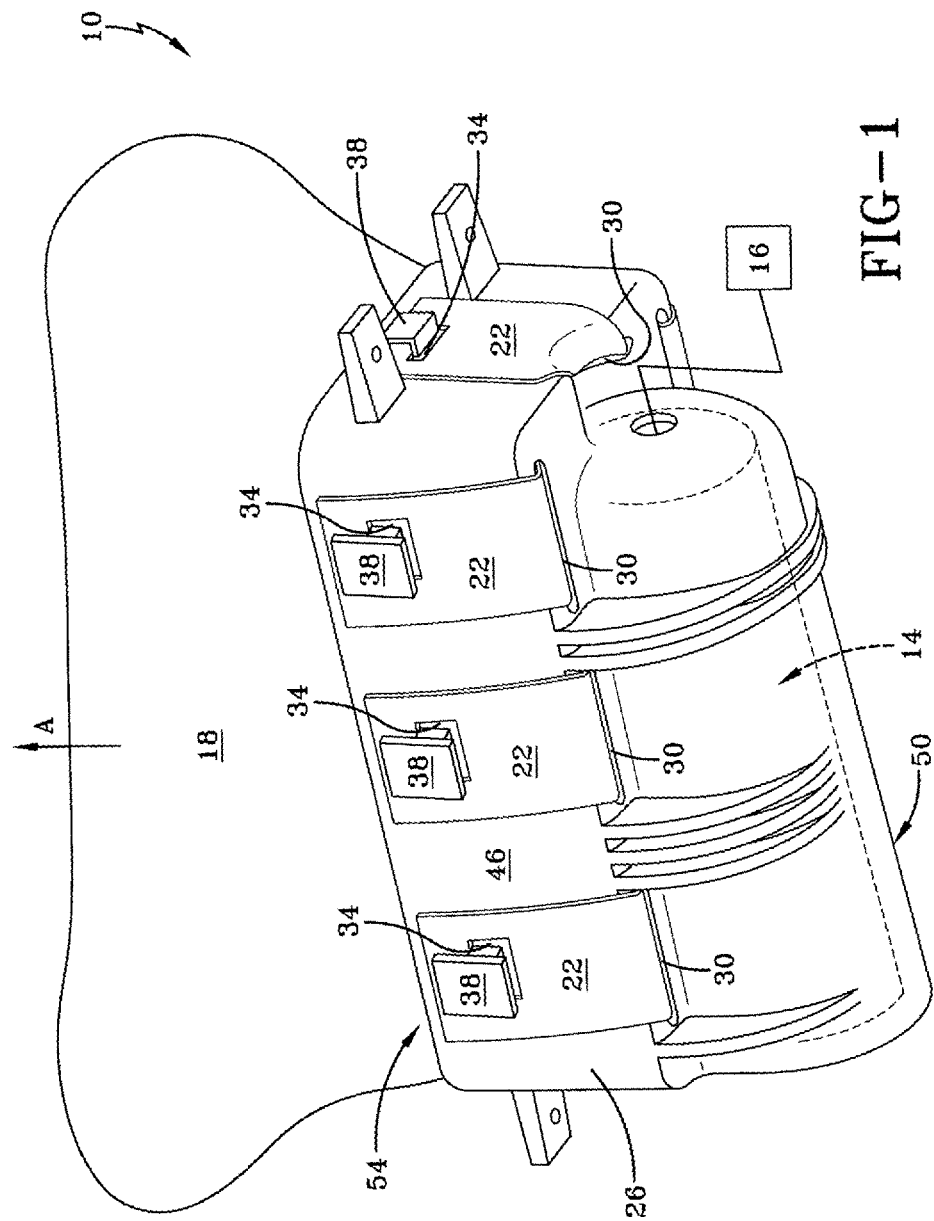
FIG. 1 illustrates the inventive air bag module, showing air bag with flaps and air bag housing with slots to receive flaps.

FIG. 1 illustrates inventive air bag module 10. Like existing air bag modules, the inventive air bag module 10 has an air bag 18, an air bag housing 26 and an air bag inflator 14. The air bag inflator 14 is activated by a crash detection system 16. As known, when a severe crash is detected, the crash detection system activates the inflator 14 to release inflation gas into the air bag 18 to cause deployment of the air bag 18 relative to the air bag housing 26 in the indicated in the drawing by an arrow A.

Unlike existing designs, the inventive air bag module 10 has an air bag 18 with flaps 22 and the air bag housing 26 has slots 30 therein. As shown in FIG. 1, the flaps 22 of the air bag 18 are passed through the slots 30 of the air bag housing 26. In addition, the flaps 22 have holes 34 that secure the flaps 22 to hooks 38. This design not only allows a secure direct connection between the air bag 18 and the housing 26 but also provides a good seal between the air bag 18 and the housing 26 so that inflation gas from the inflator 14 may fill the air bag 18 without significant leakage.

Figure 2:
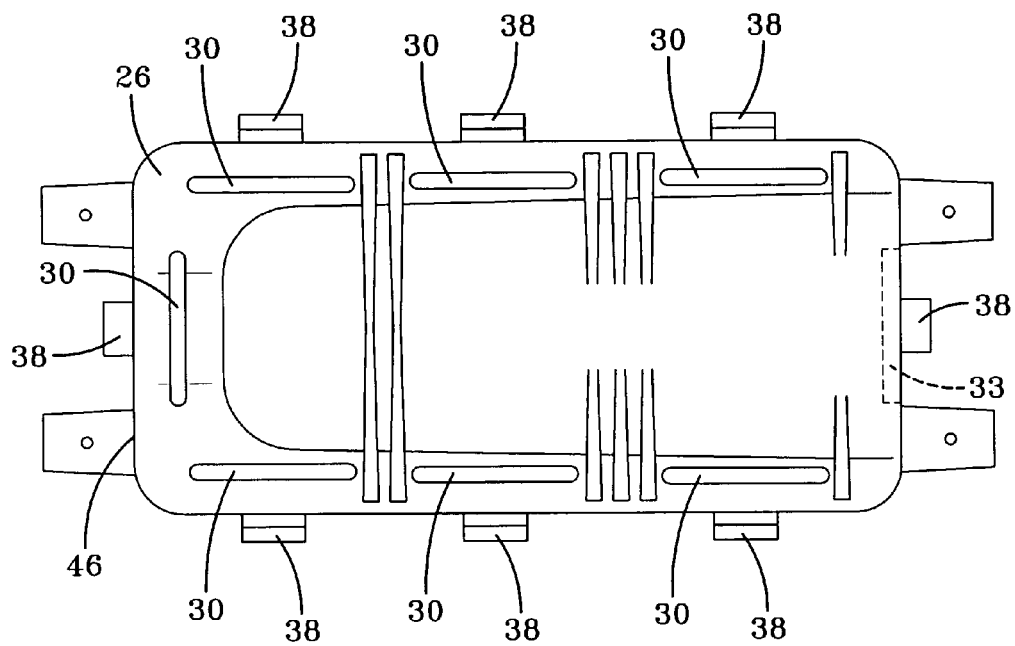
FIG. 2 is a bottom view of the housing of FIG. 1, showing the location of the slots on the housing.
Figure 3:
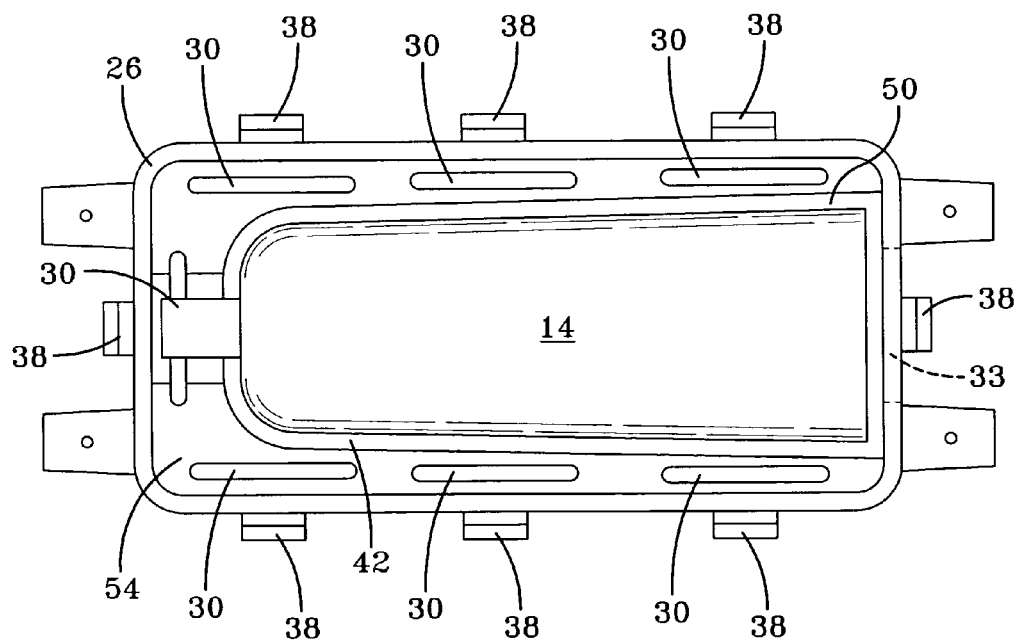
FIG. 3 is a top view of the housing of FIGS. 1 and 2, showing the location of the slots relative to an opening of the air bag housing.

FIGS. 2 and 3 illustrate a four sided air bag housing 26. FIG. 2 is a bottom view of the air bag housing 26 and shows the location of the slots 30 relative to the hooks 38. As shown, the slots 30 line the periphery of the housing 26. In FIG. 3 a slot 33 is located on the side of the housing 26 and is accordingly not visible in FIG. 2. FIG. 3 illustrates the slots 30 as well as a slot 33 at least one slot 30, 33 on each exterior side of said housing from a top view perspective.

The housing 26 has an air bag housing interior 42 and an air bag housing exterior 46. Within the interior 42 is an air bag inflator 14, contained within a bottom portion 50 of the housing 26. The air bag housing 26 further has an air bag housing opening 54 to receive folded a air bag 18 (not shown). Moreover, the air bag housing opening 54 is the opening through which the air bag 18 deploys as shown in FIG. 1. FIG. 3 illustrates how the slots 30 and a slot 33 collectively surround the air bag housing opening 54 on each extenion.

Figure 4:
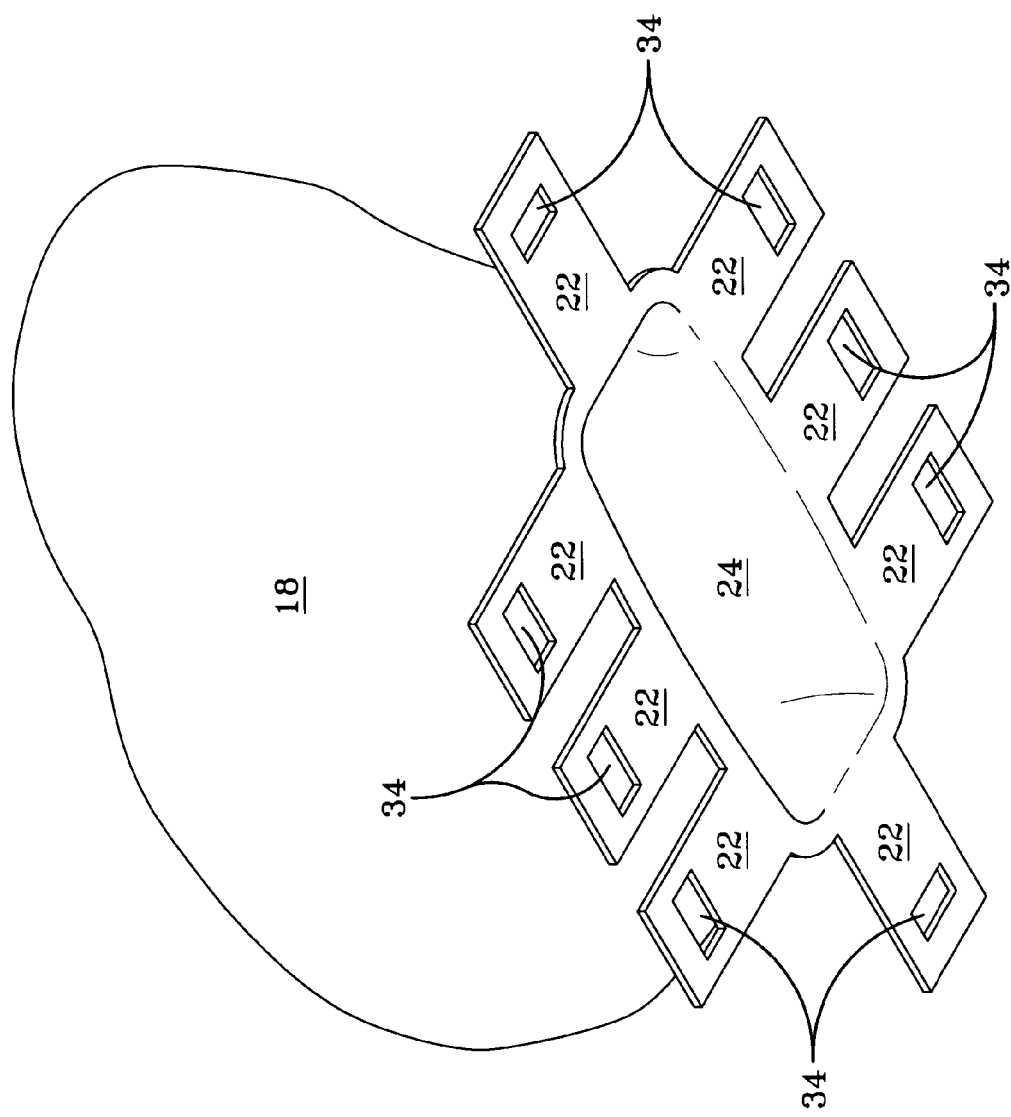
FIG. 4 illustrates the air bag of FIG. 1.

FIG. 4 illustrates an air bag 18. As shown, the air bag 18 has an air bag opening 24, which is in communication with an air bag inflator 14. In addition, the air bag 18 has flaps 22 that extend around the periphery of the air bag opening 24. Holes 34 are provided in each of flaps 22. The holes 34 are used to attach the air bag 18 to hooks 38.

Figure 5:
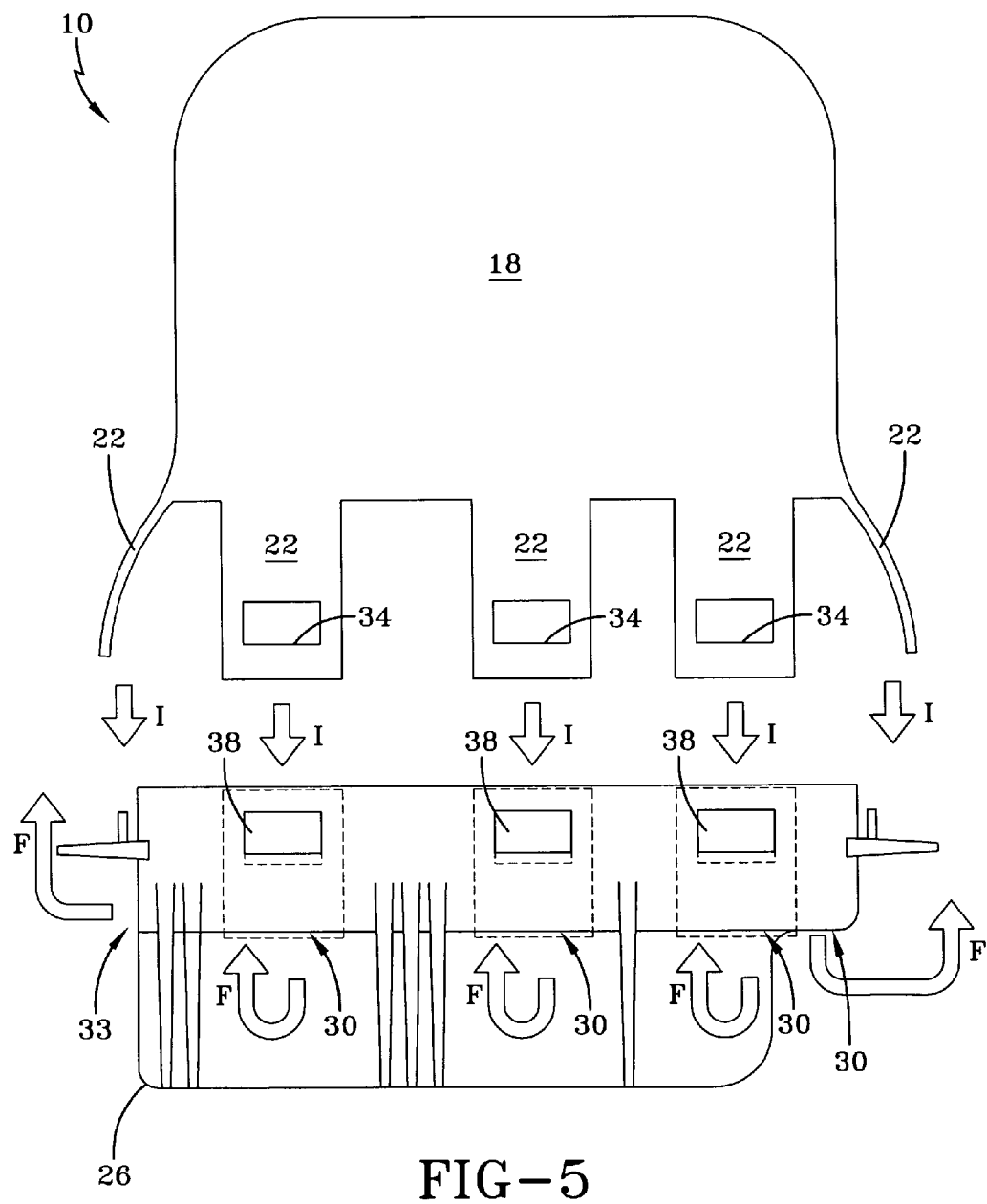
FIG. 5 illustrates how the air bag of FIGS. 1 and 4 is attached to the housing of FIGS. 1–3.

FIG. 5 illustrates how the air bag 18 is attached to an air bag housing 26. As shown, flaps 22 are passed through slots 30, 33 in the direction indicated in the drawing by a first arrow 1. After they pass through slots 30 33 the flaps 22 are then turned in the direction indicated in the drawing by a second arrow F, here a direction generally opposite to the direction of the first arrow 1, and folded and hooked over the hooks 38 of the air bag housing 26. In this fashion, the air bag 18 is secured to the air bag housing 26. Although this design shows the air bag 18 with eight flaps, eight slots and eight hooks, other designs may use four or more flaps or slots to secure the air bag 18 to the four sided air bag housing 26.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

I claim:

1. An air bag module comprising: an air bag having a plurality of flaps; an air bag inflator in communication with said air bag; and an air bag housing for storing said air bag and said air bag inflator, said air bag housing having four sides, each side having at least one aperture to receive at least one flap and wherein each flap has a first connection feature and each side of said air bag housing has a second connection feature, said first connection feature secured to said second connection feature, wherein said first connection feature is a hole and said second connection feature is a protrusion extending from each side on an exterior of said housing, said protrusion being a hook, wherein each of said hooks is spaced between an air bag housing opening and said at least one aperture.

2. The air bag module of claim 1 wherein said air bag housing has an interior and an exterior, said air bag housing receiving said air bag inflator within said interior.

3. The air bag module of claim 2 wherein said air bag housing has a bottom spaced from said air bag housing opening from which said air bag deploys, said at least one aperture located on each side of said housing between said air bag housing opening and said bottom.

4. The air bag module of claim 1 wherein said at least one aperture comprises a slot.

5. The air bag module of claim 1 wherein said plurality of flaps comprises four or more flaps extending around an opening of said air bag and said at least one aperture comprises four or more apertures to receive said two or more flaps.

6. The air bag module of claim 5 wherein said four or more apertures extend around an air bag housing opening from which said air bag deploys.

7. An air bag module comprising: an air bag having an air bag opening, said air bag having four or more flaps extending around said air bag opening; an air bag inflator in communication with said air bag opening; an air bag housing for storing said air bag and said air bag inflator, said air bag housing having four sides, each side comprising one or more apertures to receive said flaps, said four or more apertures extending around an air bag housing opening from which said air bag deploys; and wherein said flaps have a first connection feature and each side of said air bag housing has a second connection feature, said first connection feature secured to said second connection feature, wherein said first connection feature comprises a hole and said second connection feature comprises a protrusion extending from each side on an exterior of said housing and wherein said protrusion comprises a hook wherein each of said hooks is spaced between said air bag housing opening and said apertures.

8. The air bag module of claim 7 wherein said apertures comprise slots.

9. The air bag module of claim 7 wherein said air bag housing has an interior and an exterior, said air bag housing receiving said air bag inflator within said interior.

10. The air bag module of claim 9 wherein said air bag housing has a bottom spaced from said air bag housing opening, said apertures being located between said air bag housing opening and said bottom.

11. The air bag module of claim 9 wherein said flaps extend from said interior through said apertures to said second connection feature on said exterior.

* * * * *